United States Patent [19]

Baumeister et al.

[11] Patent Number: 5,333,090
[45] Date of Patent: Jul. 26, 1994

[54] OPTICAL COATING FOR REFLECTING VISIBLE AND LONGER WAVELENGTH RADIATION HAVING GRAZING INCIDENCE ANGLE

[75] Inventors: Philip Baumeister; Dennis Fischer, both of Auburn; David Trost, San Francisco, all of Calif.

[73] Assignee: Coherent, Inc., Santa Clara, Calif.

[21] Appl. No.: 959,699

[22] Filed: Oct. 13, 1992

[51] Int. Cl.⁵ .................... G02B 1/10; G02B 5/28; G02B 6/00; B32B 3/00
[52] U.S. Cl. .................... 359/584; 359/588; 359/589; 385/125; 428/156; 428/163
[58] Field of Search ............... 359/359, 360, 580, 584, 359/585, 589, 586, 588; 385/125; 428/161, 912.2, 156, 162, 163

[56] References Cited

U.S. PATENT DOCUMENTS

| 3,247,392 | 4/1966 | Thelen | 359/359 |
|---|---|---|---|
| 3,445,052 | 5/1969 | Lewallen | 428/156 |
| 3,579,130 | 5/1971 | Smiley | 359/359 |
| 3,968,288 | 7/1976 | Trexler | 428/161 |
| 4,189,205 | 2/1980 | Vandehei | 359/360 |
| 4,232,075 | 11/1980 | Gantz et al. | 428/156 |
| 4,312,570 | 1/1982 | Southwell | 359/584 |
| 4,652,083 | 3/1987 | Laakmann | 350/96.32 |
| 4,688,892 | 8/1987 | Laakmann | 350/96.32 |
| 4,688,893 | 8/1987 | Laakmann | 350/96.32 |
| 4,805,987 | 2/1989 | Laakmann et al. | 350/96.32 |
| 5,005,944 | 4/1991 | Laakmann et al. | 350/96.32 |
| 5,213,870 | 5/1993 | Yamamoto | 428/161 |

FOREIGN PATENT DOCUMENTS

| 3041720 | 11/1982 | Fed. Rep. of Germany | 428/912.2 |
|---|---|---|---|
| WO86/02775 | 5/1986 | PCT Int'l Appl. | H01K 1/26 |
| 2195787 | 4/1988 | United Kingdom | 359/580 |

OTHER PUBLICATIONS

Design of Optimum High-Reflectivity Coatings for Grazing Angles of Incidence, Shellan, J. of the Optical Society of America, vol. 2, No. 7, Jul. 1985, pp. 1057-1065.

Primary Examiner—Loha Ben
Assistant Examiner—John Juba, Jr.
Attorney, Agent, or Firm—Limbach & Limbach

[57] ABSTRACT

A coated reflector reflective of radiation having two different wavelengths over a wide range of incidence angles, including grazing incidence angles. The coated reflector can be employed in a waveguide for laser radiation useful for medical or other applications, such as a combined HeNe and $CO_2$ laser beam. Preferably, the coated reflector includes a metal substrate and a multi-layer stack thereon, the multi-layer stack consists of alternating dielectric layers of high and low refractive index material, each pair of adjacent high and low index layers of the stack has a combined matched optical thickness substantially equal to an incident short (e.g., visible) wavelength multiplied by a factor M/2, and the total matched optical thickness of the stack is substantially equal to $(2N-1)\lambda_L/8$, where M and N are positive integers and $\lambda_L$ is an incident long wavelength (such as the wavelength of a $CO_2$ laser beam). Preferably, the substrate is silver, the high index dielectric is zinc sulfide, and the low index dielectric is yttrium fluoride or cerium fluoride. In other embodiments, the invention is a coated substrate having substantially parallel indentations along which it can be folded into a polygonal shape for use a waveguide.

24 Claims, 6 Drawing Sheets

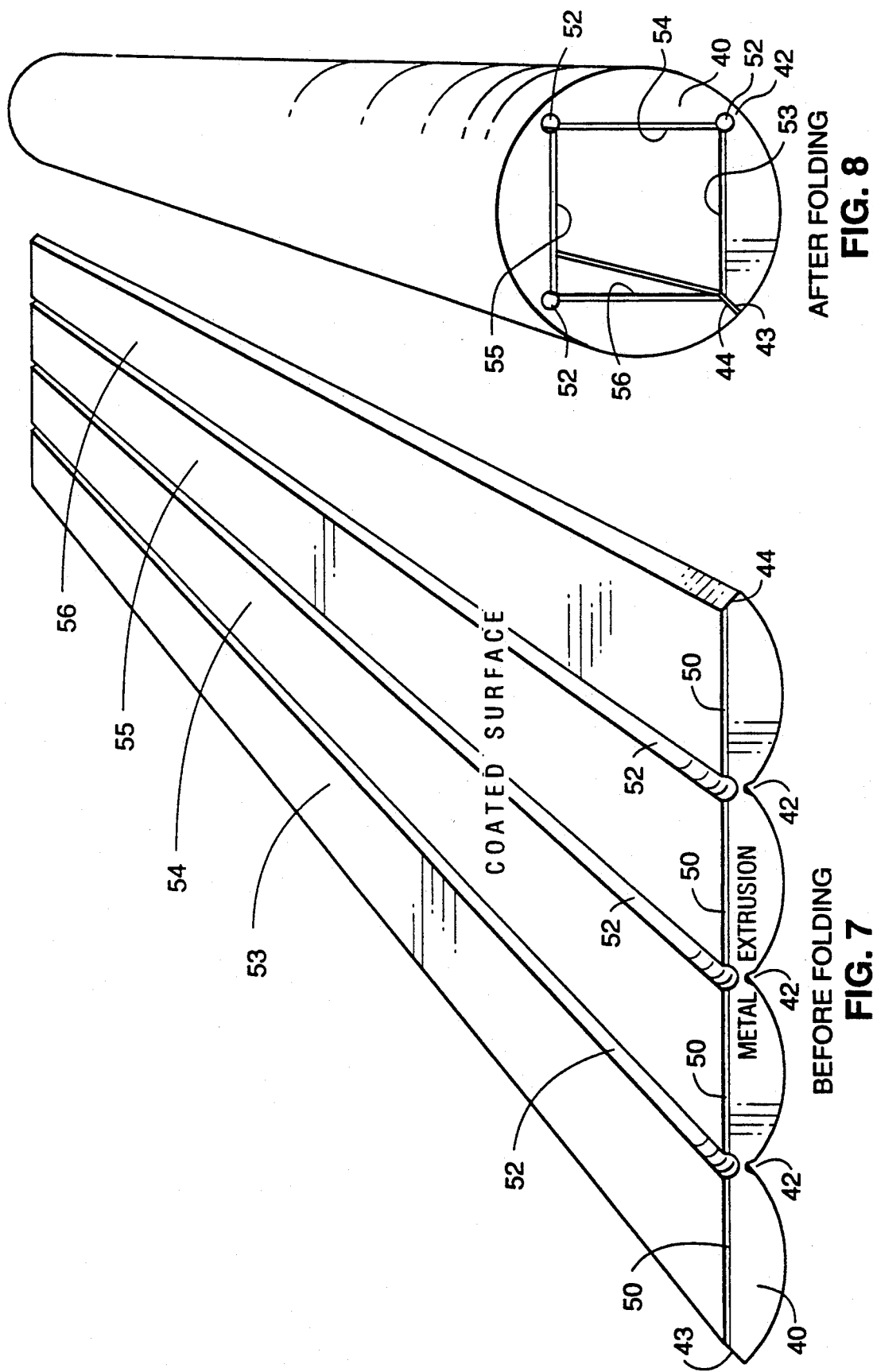

OPTICAL COATING FOR REFLECTING VISIBLE AND LONGER WAVELENGTH RADIATION HAVING GRAZING INCIDENCE ANGLE

FIELD OF THE INVENTION

The invention relates to a coated optical reflector for reflecting radiation having two different wavelengths, such as visible and infrared radiation, and to a waveguide formed from such coated reflector. More particularly, the invention relates to a coated reflector that is highly reflective of radiation having two different wavelengths (such as combined HeNe and $CO_2$ laser radiation) incident over a range of incidence angles, including grazing incidence angles, and to a waveguide formed from such coated reflector.

BACKGROUND OF THE INVENTION

Throughout this specification, including in the claims, the phrase "grazing incidence angle" is employed to denote an incidence angle in the range from 80 degrees to 90 degrees (where an incidence angle of zero degrees denotes normal incidence).

Waveguides and grazing incidence optics are employed in many commercial systems to reflect visible radiation (such as HeNe laser radiation), or infrared radiation (such as $CO_2$ laser radiation) and longer wavelength electromagnetic radiation, incident with a grazing incidence angle. When a purely metallic reflector is employed to reflect electromagnetic radiation at grazing incidence angles, the components of the radiation having S-polarization are reflected with high efficiency, but the components having P-polarization are reflected with low efficiency.

For example, FIG. 1 represents the reflectivity of gold (or silver) as a function of incidence angle, to a beam of $CO_2$ laser (infrared) radiation. FIG. 1 shows that the reflectivity of gold (and silver) to the P-polarized component of the $CO_2$ laser beam decreases substantially with increasing incidence angle, but that the reflectivity to the S-polarized component of the $CO_2$ laser beam does not exhibit significant angular dependence. It will be appreciated by inspecting FIG. 1 that after a $CO_2$ laser beam undergoes multiple reflections (at grazing incidence) from a purely metallic waveguide, substantially the entire P-polarized component of the beam may be lost, undesirably causing a beam power loss of about 50% during propagation through the waveguide.

FIG. 2 represents the reflectivity of silver as a function of incidence angle to visible radiation (orange light having wavelength 0.6 micrometer), and FIG. 3 represents the reflectivity of gold as a function of incidence angle to the same visible radiation. FIG. 2 shows that the reflectivity of silver to the P-polarized component of the radiation decreases slightly with increasing incidence angle, but that silver's reflectivity to the S-polarized component of the radiation does not exhibit significant angular dependence. FIG. 3 shows that the reflectivity of gold to the P-polarized component of the 0.6 micrometer visible radiation depends strongly on incidence angle (although the minimum reflectivity occurs at a lower incidence angle than in FIG. 1), and that gold's reflectivity to the S-polarized component of the radiation increases with increasing incidence angle.

In an effort to address the problem of decreased reflectivity of metal (to visible radiation) in certain incidence angle ranges, it has been proposed to deposit stacks of alternating high and low refractive index dielectric layers, each having a matched optical thickness of a quarter-wavelength, on metal to increase the metal's reflectivity to visible radiation. This technique efficiently increases reflectivity to normally incident visible radiation (having both P- and S-polarization), but it also increases reflectivity to visible radiation (of both polarizations) that is incident at grazing incidence angles (although with lower efficiency). However, if the difference between reflectivity to P-polarized and S-polarized radiation is large (for example, at a grazing incidence angle), an impractically large number of quarter-wave layers are required in a stack to achieve adequate reflectivity to both P-polarized and S-polarized components at grazing incidence angles.

Another limitation of the prior art technique described in the previous paragraph is that a stack of layers, each having quarter-wave thickness at a visible wavelength (such as a HeNe laser wavelength), will have no significant effect on infrared (or longer wavelength) radiation incident thereon. Thus, although a reflector coated with a multi-layer dielectric stack may have adequate reflectivity to visible radiation at grazing incidence, it will generally not have adequate reflectivity to infrared (or longer wavelength) radiation in the same grazing incidence angle range.

Waveguides and grazing incidence optics have been employed in commercial systems to reflect infrared radiation (such as $CO_2$ laser radiation) and longer wavelength radiation incident at grazing incidence angles. For example, U.S. Pat. No. 4,805,987, issued Feb. 21, 1989, and U.S. Pat. No. 5,005,944, issued Apr. 9, 1991, to Laakman, et al., disclose hollow lightpipes and lightpipe tip members that are highly reflective of $CO_2$ laser radiation at grazing incidence angles. Each of these hollow members consists of a housing (said to consist preferably of flexible metal) and a highly reflective coating on the housing. The reflective coating is a dielectric material (such as silicon carbide) having refractive index with a real part less than one, and having sufficient thickness to assure bulk absorption properties.

However, conventional reflectors that are highly reflective of long wavelength electromagnetic radiation (including those described in U.S. Pat. Nos. 4,805,987 and 5,005,944) over a range of incidence angles (including grazing incidence angles) have not also been highly reflective of substantially shorter wavelength radiation (e.g., visible radiation) over the same range of incidence angles.

Moreover, conventional reflectors of the type described in U.S. Pat. Nos. 4,805,987 and 5,005,944 are difficult to form into hollow waveguides (or lightpipes). This is because when flat substrates coated with commonly used reflective coatings of the type described in U.S. Pat. Nos. 4,805,987 and 5,005,944 are rolled to form tubes, stresses on the coatings often cause the coatings to crack (as explained at column 5, lines 50–60 of U.S. Pat. No. 4,805,987). Use of reflective coating materials having high ductility (such as lead fluoride) may avoid the cracking problem, but such ductile materials are unsuitable for many applications because they are toxic.

It is also difficult to sputter (or otherwise deposit) a reflective coating (of the type described in U.S. Pat. Nos. 4,805,987 and 5,005,944) on a pre-formed hollow waveguide housing, particularly in the typical case that the hollow housing has very small diameter (e.g., one millimeter) and very long length (e.g., one meter). It is particularly difficult to deposit reflective coatings on such a hollow housing in a manner providing precise control of the thickness of the deposited layer.

SUMMARY OF THE INVENTION

The invention is a coated reflector highly reflective of radiation having two different wavelengths over a wide range of incidence angles, including grazing incidence angles. One wavelength can be in the visible range and the other in the longer-than-visible range. The coated reflector can be employed in a waveguide for laser beams useful for medical and other applications (for example, combined HeNe and $CO_2$ laser beams). Preferably, the coated reflector includes a metal substrate, and a multi-layer stack on the substrate consisting of alternating dielectric layers of high and low refractive index material On the reflector, with each dielectric layer having optical thickness substantially equal to an incident short wavelength (such as the wavelength of a HeNe laser beam, or another visible wavelength), and with the total (matched) optical thickness of the multi-layer stack in the range from about 0.05 to about 0.225 of an incident long wavelength (such as the wavelength of a $CO_2$ laser beam, or another infrared or longer-than-visible wavelength). In variations on this preferred embodiment, each pair of adjacent high and low index layers of the multi-layer stack has a combined optical thickness substantially equal to the incident short wavelength multiplied by a factor M/2, where M is a positive integer (although the optical thickness of the high index layer need not equal that of the adjacent low index layer). More generally, the total optical thickness of the multi-layer stack is preferably substantially equal to $(2N-1)\lambda_L/8$, where N is a positive integer and $\lambda_L$ is the incident long wavelength.

Preferably, the reflector is silver, the high refractive index dielectric material is zinc sulfide (or another high index dielectric that is substantially transparent to both visible and longer-than-visible radiation), and the low refractive index dielectric material is yttrium fluoride or cerium fluoride (or another low index dielectric that is substantially transparent to both visible and longer-than-visible radiation).

In a class of embodiments, the invention is a hollow waveguide having a polygonal cross-section, formed by folding a flat, coated substrate (typically a metal substrate coated with a multi-layer dielectric coating which may have low ductility). Because the coated substrate is folded into a polygonal waveguide, rather than rolled into a cylindrical tube, the bending stress on the optical coating is concentrated at the corners of the polygonal waveguide rather than distributed over the waveguide's entire surface Although the coating may crack at the corners of the waveguide's polygonal cross-section, the flat surfaces between the waveguide edges will be intact. The cracks in the corners will have an insignificant effect on performance of the waveguide.

BRIEF DESCRIPTION OF THE DRAWINGS

FIG. 7 is a perspective view of a second preferred embodiment of the coated reflector of the invention.

FIG. 8 is a perspective view of the coated reflector of FIG. 7, which has been folded into a hollow, polygonal waveguide.

DETAILED DESCRIPTION OF THE PREFERRED EMBODIMENTS

Figure 4:
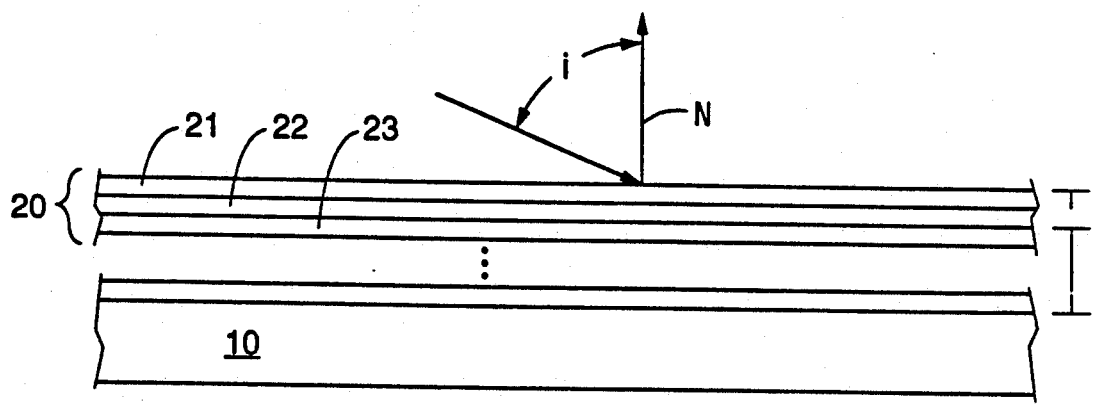
FIG. 4 is a side cross-sectional view of a preferred embodiment of the coated reflector of the invention.

A preferred embodiment of the inventive reflector will be described with reference to FIG. 4. As shown in FIG. 4, the reflector includes reflective substrate 10, and multi-layer dielectric stack 20 coated on substrate 10. Stack 20 includes dielectric layers (including layers 21, 22, and 23) having alternating high and low refractive indices (i.e., the refractive indices of layers 21 and 23 are substantially equal to a first one of a high value and a low value, and the refractive index of layer 22 is substantially equal to the other one of the high value and the low value). Preferably, each of the layers of stack 20 has an optical thickness (matched at the incidence angle of the radiation) substantially equal to a quarter-wavelength of visible electromagnetic radiation to be reflected by the coated reflector of FIG. 4. In alternative embodiments, each pair of adjacent high and low index layers of stack 20 has a combined optical thickness (matched at the incidence angle of the radiation) substantially equal to a half-wavelength (or multiple thereof) of the visible electromagnetic radiation to be reflected (although the optical thickness of the high index layer need not equal that of the adjacent low index layer).

Throughout the specification, including in the claims, the expression "optical thickness" of a layer denotes the "matched" optical thickness of the layer (unless specified otherwise to the contrary). The term "matched" is employed in the following sense.

Suppose that the "i"th layer of a multi-layer dielectric stack has a metric thickness $t_i$ and a refractive index $n_i$. At normal incidence, the optical thickness OT of the layer is the product of $t_i$ and $n_i$, namely $OT=(n_i)(t_i)$. At grazing incidence angles (e.g., 88 degrees), the foregoing formula does not accurately express the layer's optical thickness, because optical thickness at grazing incidence is increased to compensate for the difference in path lengths of the refracted rays in the stack. The matched optical thickness, $OT]_{matched}$, is approximately equal to $(n_i)(t_i)/[1-(n_0^2)/(n_i^2)]^{\frac{1}{2}}$, where $n_0$ is the refractive index of the incident medium (which is usually air with a refractive index of close to unity).

As an example, consider a layer of refractive index 2.22 that is to function at an incidence angle of 88 degrees. Its matched optical thickness, $OT]_{matched}$, is approximately equal to $(n_i)(t_i)/[1-(2.22)^{-2}9^{\frac{1}{2}}=1.12$ $(n_i)(t_i)$.

A beam incident at each layer of multi-layer stack 20 will undergo two reflections: a first portion of the beam will reflect from the top surface of the layer, and a second portion of the beam will reflect from the bottom surface of the layer. If the beam has normal incidence, the optical thickness of the layer is simply the product of the layer's physical thickness with its index of refraction. In the case that the beam has a grazing incidence angle, the optical thickness of the layer is approximately equal to $(t)(n_2)[1-(n_0/n_2)^2]^{-\frac{1}{2}}$, where t is the layer's physical thickness, $n_0$ has been defined above, and $n_2$ is the refractive index of the layer itself.

Throughout the specification, including in the claims, the expression "optical thickness" of an entire multi-layer dielectric stack denotes the sum of the optical thicknesses of the individual layers of the stack.

In alternate embodiments of the invention, each layer of stack 20 has an optical thickness substantially equal to any odd integral multiple of a quarter-wavelength (e.g., ¾ wavelength, 5/4 wavelength, and so on) of the visible electromagnetic radiation to be reflected thereby. In preferred embodiments, the total optical thickness of stack 20 is preferably in the range from about 0.05 to about 0.225 of an incident long (e.g., infrared) wavelength to be reflected thereby (for reasons to be explained below). In other preferred embodiments, the total optical thickness of the multi-layer stack is substantially equal to $(2N-1)\lambda_L/8$, where N is a positive integer and $\lambda_L$ is the incident long wavelength.

Figure 1:
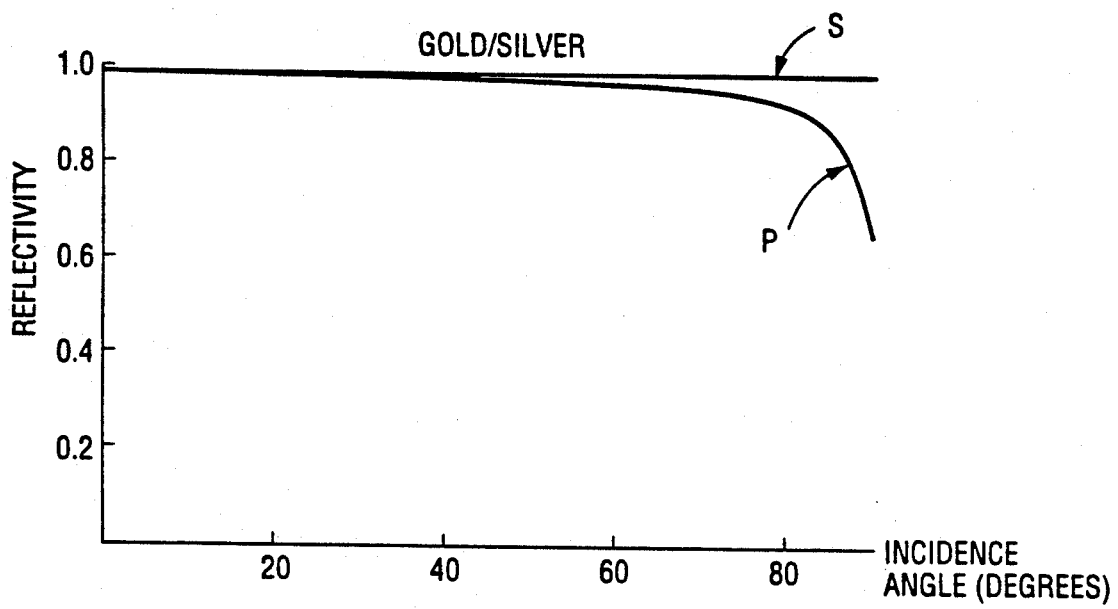
FIG. 1 is a graph of the reflectivity of gold (and silver) to infrared electromagnetic radiation, versus incidence angle of the radiation.
Figure 2:
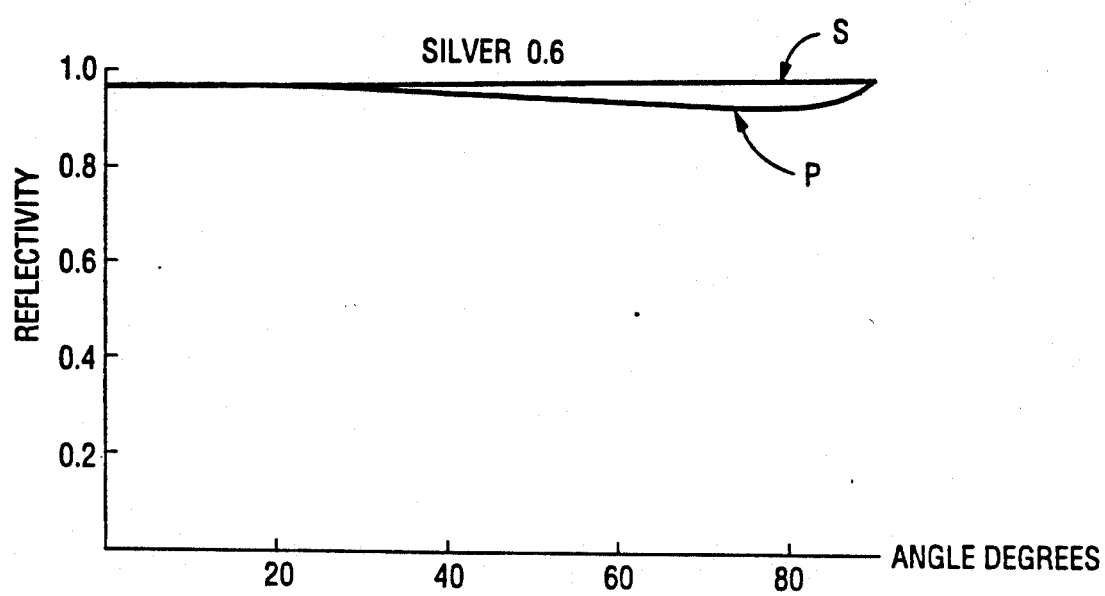
FIG. 2 is a graph of the reflectivity of silver to visible electromagnetic radiation, versus incidence angle of the radiation.
Figure 3:
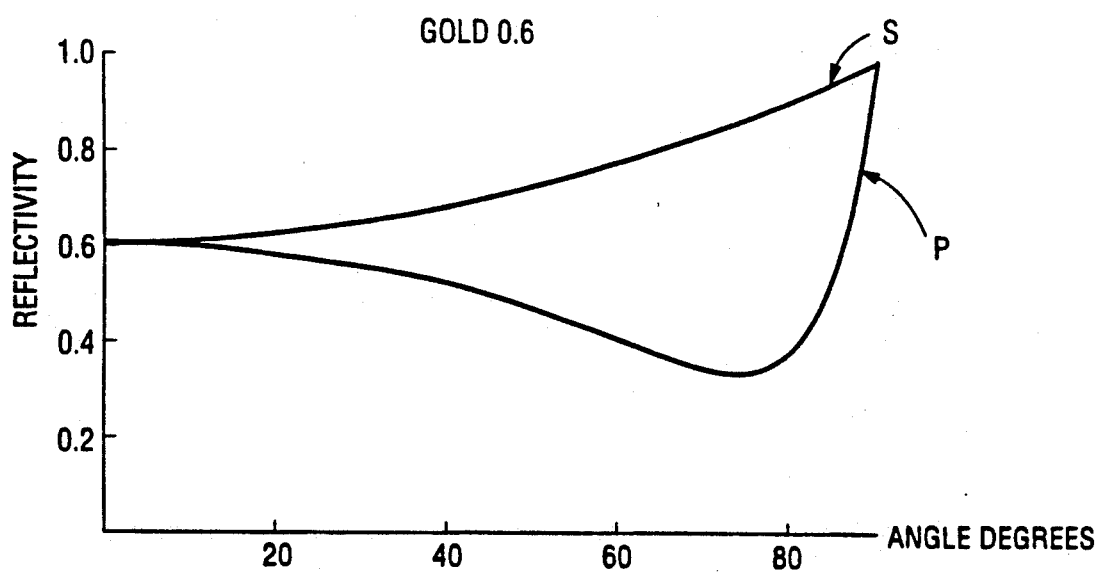
FIG. 3 is a graph of the reflectivity of gold to visible electromagnetic radiation, versus incidence angle of the radiation.

Substrate 10 is composed of (or coated with) material having high reflectivity to electromagnetic radiation having a first (longer-than-visible) wavelength and to electromagnetic radiation having a second (visible) wavelength. In a preferred embodiment, substrate 10 is made of silver (which is highly reflective of visible and infrared radiation having S-polarization, and of visible radiation having P-polarization, as explained with reference to FIGS. 1, 2, and 3). However, silver may have inadequate durability for some applications. Accordingly, substrate 10 may consist of alternative materials, such as other metals (including pure aluminum or gold), or dielectric materials whose refractive index has a real part less than one. The substrate employed in the inventive reflector can be a metal foil or a metal extrusion.

It is also within the scope of the invention for substrate 10 to consist of a material that is not highly reflective (such as an extrudable alloy of aluminum) coated with a layer of highly reflective material (such as silver or pure aluminum or gold). The multi-layer dielectric stack of the invention is coated on such highly reflective layer. Throughout the specification (including in the claims) the phrase "highly reflective" substrate and variations thereon denote not only substrates consisting entirely of highly reflective material, but also substrates coated with a highly reflective layer.

The reflector of FIG. 4 is designed reflect radiation having a wide range of incidence angles, "i," including grazing incidence angles in the range from 80 degrees to 90 degrees with respect to the normal axis, N. In accordance with the teaching of the previous paragraph, the FIG. 4 reflector will efficiently reflect visible radiation having a grazing incidence angle if stack 20 includes a sufficient number of quarter-wave layers, regardless of whether such radiation has S-polarization or P-polarization.

Figure 5:
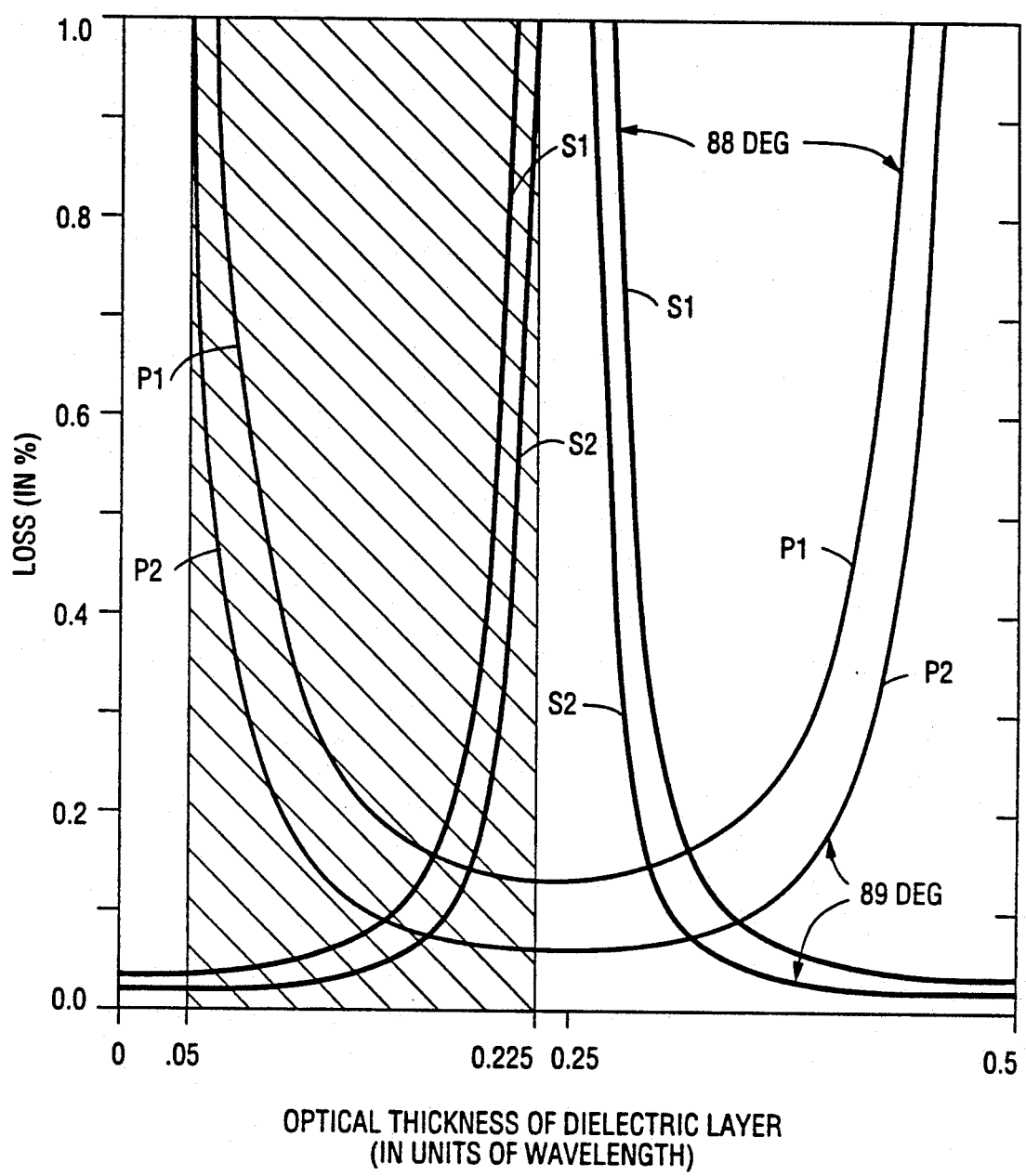
FIG. 5 is a graph of loss (one minus radiant reflectance) of silver coated with a dielectric layer of refractive index 1.8, versus optical thickness of the dielectric layer, for each of two grazing incidence angles (88 degrees and 89 degrees) of infrared electromagnetic radiation.

To ensure that the FIG. 4 reflector will also efficiently reflect longer-than-visible radiation having a grazing incidence angle, regardless of whether such radiation has S-polarization or P-polarization, the overall thickness, T, of multi-layer dielectric stack 20 is such that the optical thickness of stack 20 is approximately L/8 (i.e., greater than or equal to 0.05L, and less than or equal to 0.225L, where L is a wavelength of the longer-than-visible wavelength to be reflected by the FIG. 4 reflector. The basis for this preferred optical thickness range can be appreciated by reference to FIG. 5. FIG. 5 shows "loss" (one minus reflectivity) of a silver substrate coated with a single dielectric layer of refractive index 1.8, versus optical thickness of the dielectric layer, for each of two grazing incidence angles (88 degrees and 89 degrees) of infrared radiation. The curves S1 and P1 represent S-polarized and P-polarized components of such radiation, respectively, incident at an incidence angle of 88 degrees, and the curves S2 and P2 represent S-polarized and P-polarized components of the radiation, respectively, incident at an incidence angle of 89 degrees. As shown in FIG. 5, in the case that the dielectric layer has zero thickness, the silver substrate has good reflectivity to the S-polarized components but poor reflectivity to the P-polarized components. In the case that the dielectric layer has quarter-wave optical thickness (corresponding to coordinate 0.25 along the horizontal axis), the coated silver substrate has good reflectivity to the P-polarized components but poor reflectivity to the S-polarized components. When the dielectric layer has optical thickness in the range from about 0.05L to 0.225L (where L is the wavelength of the incident infrared radiation), the coated silver substrate has good reflectivity to both the P-polarized and S-polarized components. The inventor has recognized that the loss of multi-layer dielectric stack 20 of FIG. 4 (to longer-than-visible radiation) has a dependence on overall optical thickness similar to that shown in FIG. 5, so that the overall thickness T of stack 20 is preferably such that stack 20's optical thickness is greater than or equal to 0.05L, and less than or equal to 0.225L where L is a wavelength of the longer-than-visible wavelength to be reflected.

The dielectric layers comprising coating 20 should be transparent at both the visible and longer-than-visible wavelengths to be reflected. The high index layers can be zinc selenide or zinc sulfide, although the latter is generally preferable because it is transparent over broader range of visible wavelengths. The low index layers can be thorium fluoride, yttrium fluoride, and cerium fluoride, among others. Thorium fluoride is easy to deposit on a substrate, and is relatively stress free in the thick layers usually necessary for infrared-reflective coatings. However, thorium fluoride may be unsuitable for some medical applications because it is somewhat toxic due to its slight radioactivity (and possibly also due to chemical toxicity). Yttrium fluoride and cerium fluoride may cause difficulty with stress in the deposition process.

In a class of preferred embodiments, the FIG. 4 reflector is highly reflective of combined HeNe and $CO_2$ laser radiation, including visible HeNe laser radiation having wavelength of about 633 nm, and infrared $CO_2$ laser radiation having wavelength substantially equal to 10.6 micrometers, over a wide range of incidence angles, including grazing incidence angles. In some of these embodiments, substrate 10 is silver, the high index layers of stack 20 are zinc sulfide, and the low index layers of stack 20 are yttrium fluoride.

Of paramount importance is the selection of the number of layers of alternating refractive indices that are used in the inventive reflector. Although two different stacks may manifest a reflectance that is completely adequate at shorter wavelengths (for example, in the visible part of the spectrum), the reflectance in the longer wavelength spectral region may be entirely inadequate. As an example, FIGS. 9 and 10 are graphs of the reflectance of coated reflectors embodying the invention, having twelve-layer and sixteen-layer dielectric stacks, respectively, at a grazing incidence angle (in air) of 88 degrees as a function of wavelength.

Figure 9:
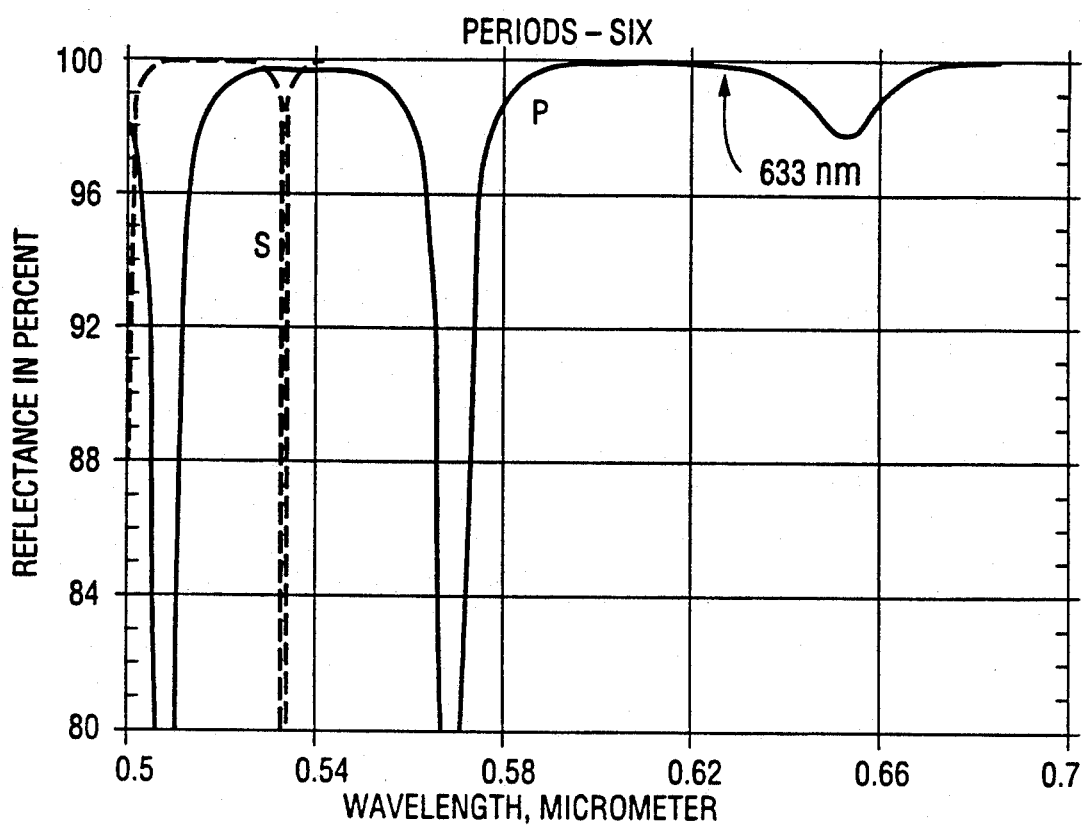
FIG. 9 is a graph of the reflectance of a coated reflector, having a twelve-layer dielectric stack and embodying the invention, as a function of wavelength.

The reflector of FIG. 9 is a silver substrate coated with twelve alternating layers of high refractive index material (zinc sulfide) and low refractive index material (lanthanum sulfide). Each of the zinc sulfide and lanthanum sulfide layers has quarter-wave optical thickness at a control wavelength of 650 nm (matched at an 88 degree incidence angle).

Figure 10:
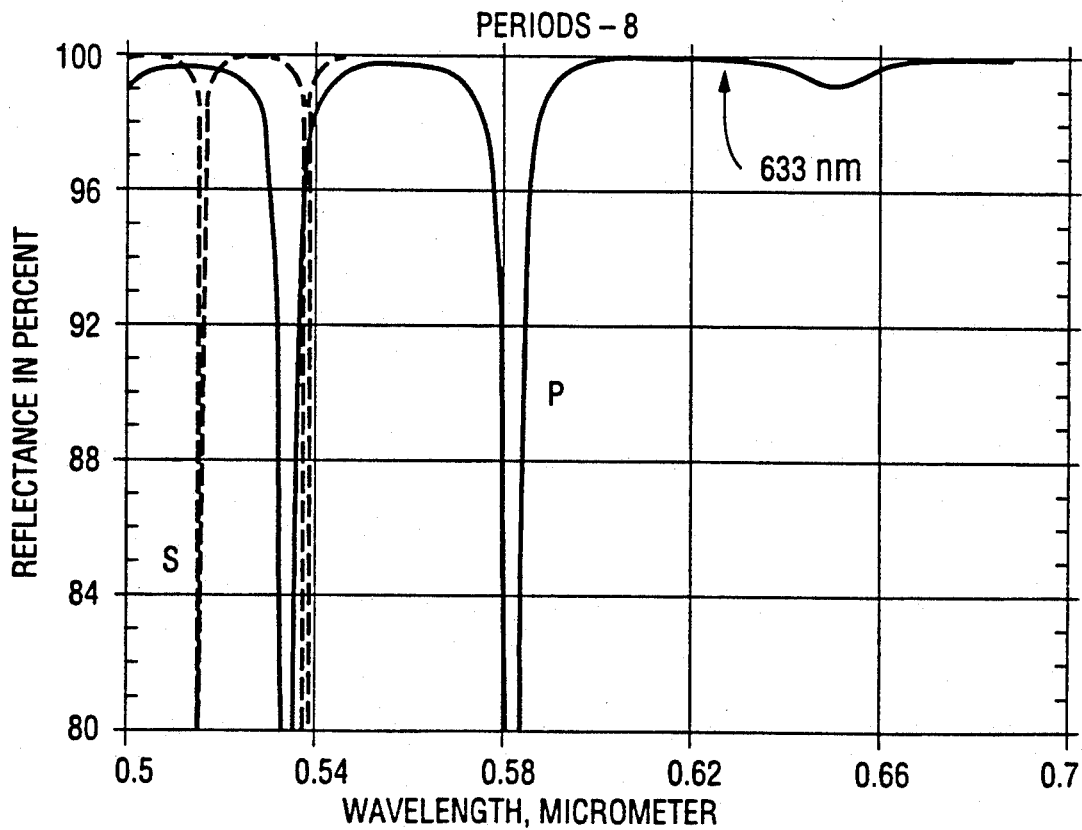
FIG. 10 is a graph of the reflectance of a coated reflector, having a sixteen-layer dielectric stack and embodying the invention, as a function of wavelength.

The reflector of FIG. 10 is a silver substrate coated with sixteen alternating layers of high refractive index material (zinc sulfide) and low refractive index material (lanthanum sulfide). Each of the zinc sulfide and lanthanum sulfide layers has quarter-wave optical thickness at a control wavelength of 650 nm (matched at an 88 degree incidence angle).

Except for narrow dips in reflectance near 530 nm, the reflectance for "s" linearly polarized flux is greater than 0.999 (in both FIG. 9 and FIG. 10). The reflectance at 633 nm for "p" linearly polarized flux is adequate (in both FIG. 9 and FIG. 10).

Figure 11:
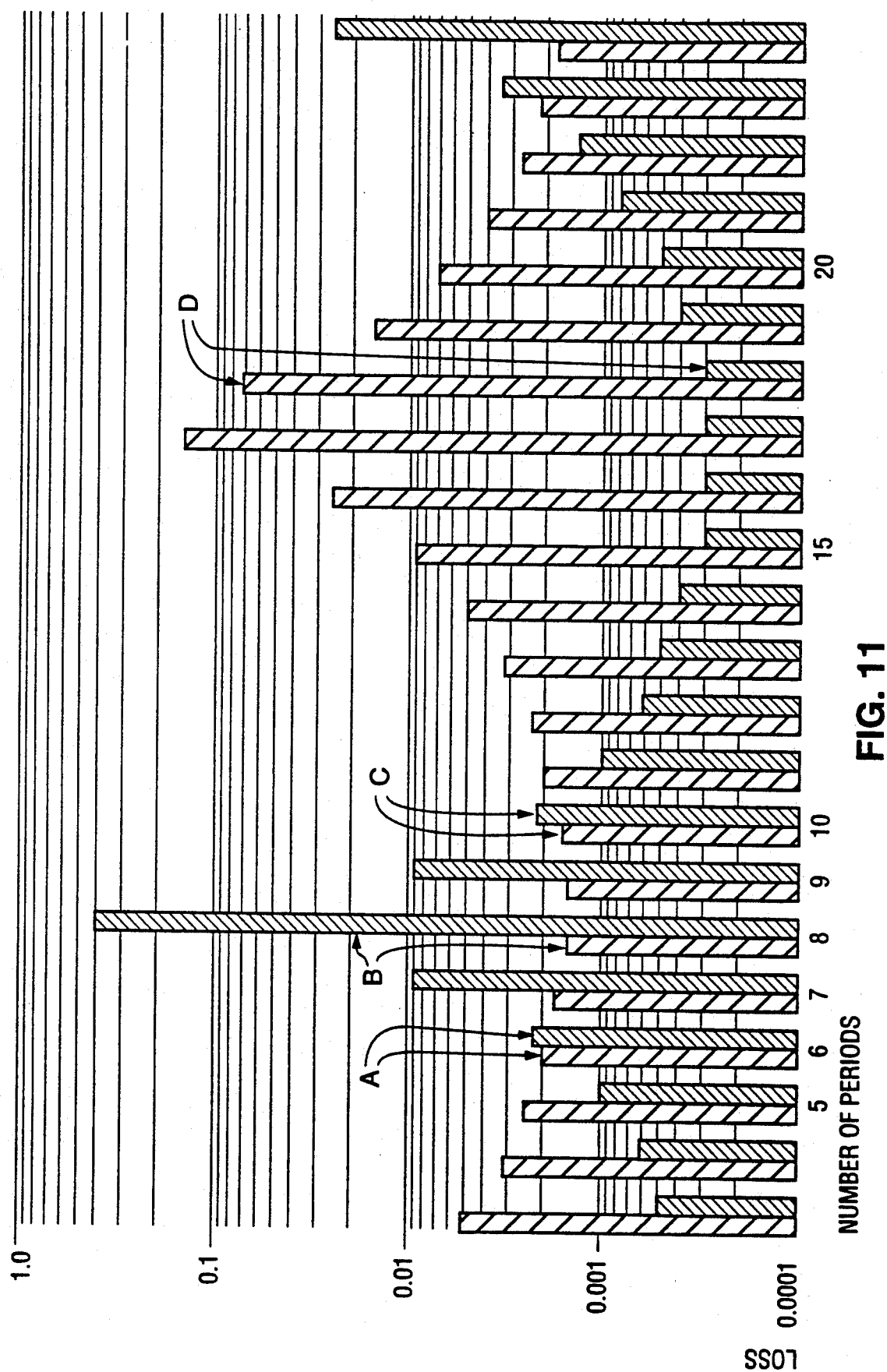
FIG. 11 is a graph of loss (one minus reflectivity) for a class of preferred embodiments of the invention, versus the number of periods (adjacent high and low dielectric layer pairs in the multi-layer dielectric stack thereof), in response to incident radiation having a 10.6 micrometer wavelength.

However, FIG. 11 shows that at the much longer wavelength of 10.6 micrometers, the FIG. 9 embodiment has very different loss (one minus radiant reflectance) characteristics than does the FIG. 10 embodiment. FIG. 11 depicts the loss for a class of preferred embodiments of the invention, versus the number of periods (adjacent high and low dielectric layer pairs in a multi-layer dielectric stack), in response to incident radiation having a 10.6 micrometer wavelength. Each dielectric layer in each such preferred embodiment has quarter-wave optical thickness at a control wavelength of 650 nm, matched at an 88 degree incidence angle. In FIG. 11, the left bar for each period represents loss for radiation having "s" polarization (incident in air with an incidence angle of 88 degrees) and the right bar for each period represents loss for radiation having "p" polarization (incident in air with an incidence angle of 88 degrees).

The bars identified by reference character "A" in FIG. 11 represent the six-period embodiment of FIG. 9, and indicate that the loss is well below 0.005 for both "s"-polarized and "p"-polarized radiation. However, the bars identified by reference character "B" in FIG. 11 represent the eight-period embodiment of FIG. 9, and indicate that the loss for this embodiment is substantially different for "s"-polarized and "p"-polarized radiation (the loss for "s"-polarized radiation is about 25%, which is unacceptably high for most applications).

When even more periods are used (e.g., for ten periods, as identified by reference character "C"), the loss for both linear polarizations is again acceptably low. However, for eighteen periods (as identified by reference character "D"), the loss is again substantially different for "s"-polarized and "p"-polarized radiation, and the loss for "p"-polarized radiation is unacceptably high for most applications.

The strong dependence of loss on the number of periods of a reflector coated with a multi-layer dielectric stack can be explained as follows. A reflector coated with a single dielectric layer has a loss which depends strongly on the dielectric layer's optical thickness (for a given wavelength $\lambda$, matched at a given angle). The loss is low (typically, acceptably low) for both "s" and "p" polarizations when the optical thickness is $\lambda/8$, $3\lambda/8$, or $5\lambda/8$. However, the loss for "p" polarized flux is much higher than for "s" polarized flux (and typically, unacceptably high) when the optical thickness is an odd integral multiple of a quarter wavelength $\lambda$ (i.e., $\lambda/4$, $3\lambda/4$, $5\lambda/4$, and so on), and the loss for "s" polarized flux is much higher than for "p" polarized flux (and typically, unacceptably high) when the optical thickness is equal to $\lambda/2$ or a multiple of $\lambda/2$. Choice of an optical thickness of $\lambda/8$, $3\lambda/8$, or $5\lambda/8$ for the layer represents a compromise, in that although the loss is less for one or other of the polarizations at the quarterwave or halfwave optical thicknesses, the loss is still acceptably low at the "compromise" optical thicknesses.

The inventors have recognized that in preferred embodiments of the inventive coated reflector, the total optical thickness of the multi-layer stack is in the range from about 0.05 to about 0.225 of an incident long wavelength (because the multi-layer stack can be approximated as a single layer of a dielectric material whose index is the mean of the high and low index layers of the stack). More generally, the inventors have recognized that the total optical thickness of the multi-layer stack should be substantially equal to $(2N-1)\lambda_L/8$, where N is a positive integer and $\lambda_L$ is the incident long wavelength. It is an important aspect of the invention that the number of periods of the multi-layer dielectric stack (of the inventive coated reflector) are selected so that the loss at the incident long wavelength (which can be 10.6 micrometers) is acceptably low.

In variations on the above-described embodiments, the multi-layer stack (on the reflective substrate of the invention) consists of alternating dielectric layers of high and low refractive index material, where the optical thicknesses of the high index dielectric layers are different from the optical thicknesses of the low index dielectric layers. For example, consider embodiments of the invention having structure: $(air)(xHyL)q(silver)$, which indicates that a multi-layer stack having "q" periods is deposited on a silver substrate, with each period consisting of a high index layer H of optical thickness "x" and a low index layer L of optical thickness "y." Examples of such embodiments include those in which the ratio y/x is substantially equal to 3, those in which the ratio y/x is substantially equal to 2, as well as those in which the ratio y/x is substantially equal to 1. In general, each pair of adjacent high and low index layers of the multi-layer stack should have a combined optical thickness (matched at the incidence angle) substantially equal to a half-wavelength (or multiple thereof) of the visible electromagnetic radiation to be reflected.

In other variations, the inventive optical reflector includes a substrate that is highly reflective of electromagnetic radiation having a first wavelength (such as a longer-than-visible wavelength) and a multi-layer stack of dielectric layers on the substrate (where at least one of the layers has a refractive index different than at least one other one of the layers). Each of the dielectric layers has a combined matched optical thickness selected for enhancing overall reflectivity of the optical reflector to electromagnetic radiation having a second wavelength (where the first wavelength is longer than the second wavelength, and the second wavelength can be a visible wavelength), and the stack has an overall matched optical thickness for enhancing reflection of radiation having the first wavelength. Preferably, the overall matched optical thickness of the stack is not less than $0.05\lambda_L(2N-1)$ and not greater than $0.225\lambda_L(2N-1)$, where N is a positive integer and $\lambda_L$ is the first wavelength.

Another embodiment of the invention is a hollow waveguide having a polygonal cross-section, formed by folding a flat, coated substrate into substantially flat portions. Typically, the coated substrate is a metal substrate coated with a multi-layer, dielectric coating having low ductility. In one class of embodiments of the folded waveguide, the coated substrate is metal which has been anodized so that its anodized surface portion comprises a "coating." For example, the coated substrate can be formed by anodizing an aluminum extrusion to produce a surface layer of aluminum oxide on the aluminum.

Figure 6:
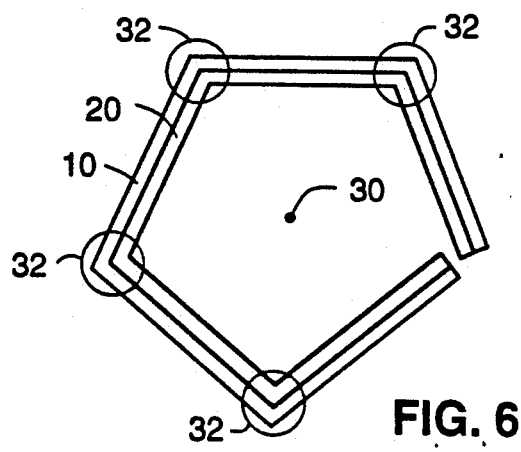
FIG. 6 is a cross-sectional view of the coated reflector of FIG. 4, which has been folded into a hollow, polygonal waveguide.

An example of the folded waveguide of the invention is the five-sided waveguide shown in FIG. 6. The waveguide of FIG. 6 is formed by folding the coated reflector of FIG. 4 into five flat surface portions separated by four edges 32. The coated reflector's multi-layer stack 20 faces inward (i.e., faces the waveguide's central longitudinal axis 30). A beam of radiation will thus multiply-reflect with grazing incidence from stack 20 as it propagates along axis 30 (generally perpendicularly to the plane of FIG. 6), and during each such reflection, a portion of the beam will propagate through stack 20 and then reflect with grazing incidence from substrate 10.

Because the FIG. 6 waveguide is produced by folding a flat, coated substrate, rather than rolling such a coated substrate into a cylindrical tube, the bending stress on coating 20 is concentrated at corners 32 rather than distributed over the entire inner surface of the waveguide. Although coating 20 may crack at corners 32, the flat surfaces of coating 20 between corners 32 will be intact. Any cracks at corners 32 will have an insignificant effect on performance of the waveguide.

FIG. 7 is a perspective view of a second preferred embodiment of the inventive coated reflector, and FIG. 8 is a perspective view of the coated reflector of FIG. 7 folded into a hollow, polygonal waveguide.

The reflector of FIG. 7 includes substrate 40 (preferably, a metal extrusion or metal foil), and optical coating 50 deposited on substrate 40. Coating 50 can be a multi-layer dielectric coating identical (or similar) to coating 20 of FIG. 4, or it can be some other coating having characteristics (refractive index, transmissivity, optical thickness, and the like) selected for reflecting selected radiation. For example, where substrate 40 is aluminum, coating 50 can be a layer of aluminum oxide formed by anodizing a portion of the aluminum.

Substrate 40 is formed with thin portions between bottom indentations 42 and top indentations 52, and relatively thick portions separated by the thin portions. Coating 50 is deposited on indentations 52, as well as on the remaining (flat) portions of the top surface of substrate 40 (or is formed by anodizing the indented substrate). Coating 50 includes flat coating portions 53, 54, 55, and 56.

To produce the hollow waveguide of FIG. 8, the coated reflector of FIG. 7 is folded about each of its three thin portions, until the reflector's left face 43 meets right face 44. As shown in FIG. 8, when indentations 52 have been so folded, each of folded indentations 52 surrounds a cylindrical region (which may be an empty void). Each such cylindrical region is separated from the main, rectangular central cavity defined by the four inward-facing flat coating portions 53, 54, 55, and 56. Although, stresses on coating 50 at indentations 52 (during folding of the FIG. 7 reflector) may cause coating 50 to crack at each of the three cylindrical regions 52 of FIG. 8, flat surfaces 53, 54, 55, and 56 of coating 50 between regions 52 will be intact. Any cracks at regions 52 of FIG. 8 will have no effect (or no more than an insignificant effect) on reflection of grazingly incident radiation from surfaces 53–56 of the FIG. 8 waveguide.

In practice, we have found that folded regions 52 in FIG. 8 will sometimes become filled with displaced metal and/or cracked coating material during the folding process (and will not define empty voids). However, even in such cases, flat surfaces 53, 54, 55, and 56 of coating 50 between regions 52 will be intact.

As is also apparent from FIG. 8, the scalloped profile of the bottom face of the FIG. 7 reflector causes the waveguide of FIG. 8 to have a smooth, cylindrical outer surface.

Various modifications and alterations in the structure and method of the invention will be apparent to those skilled in the art without departing from the scope and spirit of this invention. Although the invention has been described in connection with specific preferred embodiments, it should be understood that the invention as claimed should not be unduly limited to such specific embodiments.

What is claimed is:

1. An optical reflector, including:
   a substrate reflective of electromagnetic radiation having a first wavelength and a second wavelength, wherein the first wavelength is shorter than the second wavelength; and
   a multi-layer stack of alternating high and low refractive index dielectric layers on the substrate, wherein each pair of adjacent ones of the layers has a combined matched optical thickness substantially equal to the first wavelength multiplied by a factor M/2, where M is a positive integer, and wherein the stack has an overall matched optical thickness for enhancing reflection of radiation having the second wavelength.

2. The reflector of claim 1, wherein the first wavelength is a visible wavelength and the second wavelength is a longer-than-visible wavelength.

3. The reflector of claim 1, wherein the overall matched optical thickness of the stack is not less than 0.05 of the second wavelength, and not greater than 0.225 of said second wavelength.

4. The reflector of claim 1, wherein the overall matched optical thickness of the stack is not less than $0.05\lambda_L(2N-1)$ and not greater than $0.225\lambda_L(2N-1)$, where N is a positive integer and $\lambda_L$ is the second wavelength.

5. The reflector of claim 1, wherein each of the layers has a matched optical thickness substantially equal to one quarter of the first wavelength.

6. The reflector of claim 1, wherein the substrate is composed of silver.

7. The reflector of claim 1, wherein the first wavelength is a wavelength of a HeNe laser beam.

8. The reflector of claim 1, wherein the second wavelength is substantially equal to 10.6 micrometers.

9. The reflector of claim 1, wherein the high refractive index dielectric layers are substantially transparent at both the first wavelength and the second wavelength, and the low refractive index dielectric layers are substantially transparent at both the first wavelength and the second wavelength.

10. The reflector of claim 9, wherein the substrate is silver, the high refractive index dielectric layers are zinc sulfide, and the low refractive index dielectric layers are yttrium fluoride.

11. The reflector of claim 1, wherein the substrate has substantially parallel indentations defining relatively thin portions of said substrate, wherein each of the relatively thin portions separates two relatively thick portions of the substrate, and wherein the relatively thin portions are sufficiently thin to enable the substrate to be folded along said indentations.

12. The reflector of claim 11, wherein the substrate is a metal extrusion.

13. The reflector of claim 11, wherein the substrate has a left face and a right face, and wherein the indentations are such that when the substrate has been folded along the indentations until the left face meets the right face, the folded substrate encloses a main volume, and each of the indentations defines a region separate from the main volume.

14. A coated optical reflector reflective of electromagnetic radiation having grazing incidence, including:
a substrate having a top face and a bottom face, and substantially parallel indentations in at least one of the top face and the bottom face, wherein the indentations define thin portions of the substrate, each of the thin portions separates two relatively thick portions of the substrate, and the thin portions are sufficiently thin to enable the substrate to be folded along said indentations; and
an optical coating on the top face, wherein the optical coating comprises a multi-layer stack of alternating high and low refractive index dielectric layers, wherein the substrate has a left face and a right face, wherein the indentations include top indentations in the top face, and wherein the top indentations are shaped such that when the substrate has been folded along the indentations so that the left face meets the right face, the folded substrate encloses a main volume, and each of the top indentations defines a region separate from the main volume.

15. A coated optical reflector reflective of electromagnetic radiation having grazing incidence, including:
a substrate having a top face and a bottom face, and substantially parallel indentations in at least one of the top face and the bottom face, wherein the indentations define thin portions of the substrate, each of the thin portions separates two relatively thick portions of the substrate, and the thin portions are sufficiently thin to enable the substrate to be folded along said indentations, wherein the substrate is a metal extrusion; and
an optical coating on the top face wherein the optical coating comprises a multi-layer stack of alternating high and low refractive index dielectric layers.

16. A coated optical reflector reflective of electromagnetic radiation having grazing incidence, including:
a substrate having a top face and a bottom face, and substantially parallel indentations in at least one of the top face and the bottom face, wherein the indentations define thin portions of the substrate, each of the thin portions separates two relatively thick portions of the substrate, and the thin portions are sufficiently thin to enable the substrate to be folded along said indentations; and
an optical coating on the top face, wherein the optical coating comprises a multi-layer stack of alternating high and low refractive index dielectric layers,
wherein the substrate is metal, and the optical coating includes an anodized surface portion of the substrate.

17. The reflector of claim 16, wherein the metal is aluminum, and the anodized surface portion is aluminum oxide.

18. A coated optical reflector reflective of electromagnetic radiation having grazing incidence, including:
a substrate having a top face and a bottom face, and substantially parallel indentations in at least one of the top face and the bottom face, wherein the indentations define thin portions of the substrate, each of the thin portions separates two relatively thick portions of the substrate, and the thin portions are sufficiently thin to enable the substrate to be folded along said indentations; and
an optical coating on the top face, wherein the optical coating comprises a multi-layer stack of alternating high and low refractive index dielectric layers,
wherein the substrate is reflective of electromagnetic radiation having a first wavelength and a second wavelength, wherein the first wavelength is shorter than the second wavelength, and wherein the coating is substantially transparent at the second wavelength and has an overall matched optical thickness for enhancing reflection of radiation having said second wavelength.

19. The reflector of claim 18, wherein the first wavelength is a visible wavelength and the second wavelength is a longer-than-visible wavelength.

20. The reflector of claim 18, wherein the first wavelength is a wavelength of a HeNe laser beam, and the second wavelength is substantially equal to 10.6 micrometers.

21. The reflector of claim 18, wherein the coating is a multi-layer stack of alternating high and low refractive index dielectric layers, wherein each of the layers has a matched optical thickness substantially equal to one quarter of said first wavelength, and wherein the stack has an overall matched optical thickness, wherein said overall matched optical thickness is not less than 0.05 of said second wavelength and not greater than 0.225 of said second wavelength.

22. An optical reflector, including:
a substrate reflective of electromagnetic radiation having a first wavelength; and a multi-layer stack of dielectric layers on the substrate, wherein at least one of the layers has a refractive index different than that of at least another one of the layers, and wherein each of the layers has a matched optical thickness for enhancing overall reflectivity of the optical reflector to electromagnetic radiation having a second wavelength, where the first wavelength is longer than the second wavelength, and wherein the stack has an overall matched optical thickness for enhancing reflection of radiation having the first wavelength.

23. The reflector of claim 22, wherein the overall matched optical thickness of the stack is not less than $0.05\lambda_L(2N-1)$ and not greater than $0.225\lambda_L(2N-1)$, where N is a positive integer and $\lambda_L$ is the first wavelength.

24. The reflector of claim 22, wherein the second wavelength is a visible wavelength and the first wavelength is a longer-than-visible wavelength.

* * * * *